UNITED STATES PATENT OFFICE.

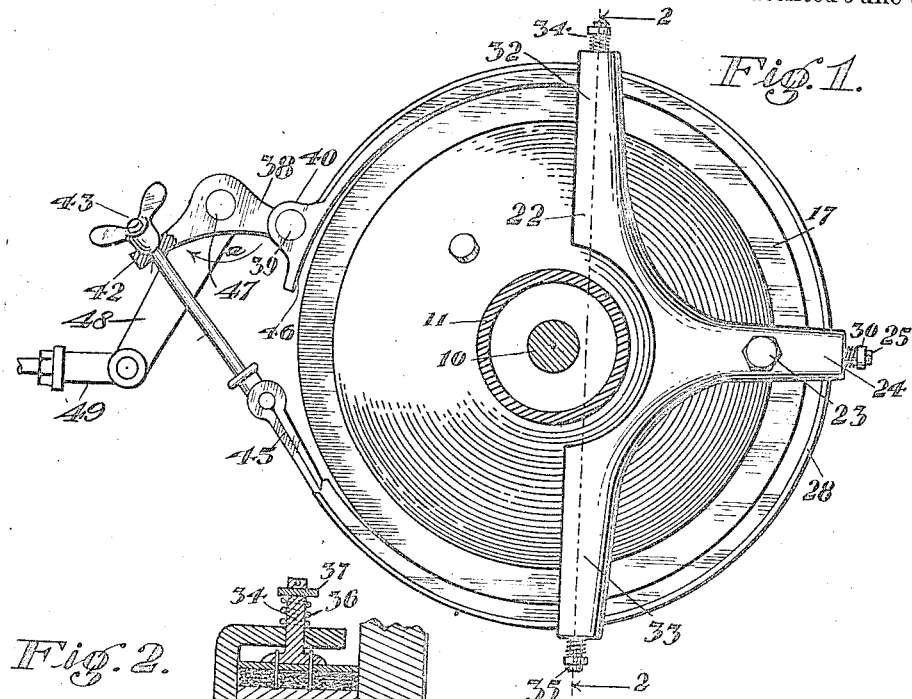

WILLIAM J. MILLER, OF LOS ANGELES, CALIFORNIA.

BRAKE.

1,229,119.  Specification of Letters Patent.  Patented June 5, 1917.

Application filed June 21, 1916. Serial No. 105,025.

*To all whom it may concern:*

Be it known that I, WILLIAM J. MILLER, a citizen of the United States, residing at Los Angeles, in the county of Los Angeles and State of California, have invented new and useful Improvements in Brakes, of which the following is a specification.

This invention relates to a vehicle brake and pertains particularly to a vehicle brake suitable to be mounted upon the Ford type of car.

It is the principal object of this invention to provide cars of the Ford type with band brakes which act upon drums of enlarged diameter and are adapted to be substituted for the internal expanding brakes in common use.

Another object is to provide a band brake with a drum of enlarged diameter which may be mounted in combination with the brake housing in use upon a Ford car so that no alteration of the parts involved need be made or special dust shields provided.

Another object is to provide a special brake supporting spider which may be readily applied to the vehicle axle and will support the brake band at various points around its periphery in a floating and resilient manner.

Another object is to provide a brake band actuating mechanism which is simple in its construction and may be readily adjusted.

Another object is to provide means incorporated within the brake adjusting mechanism whereby universal relation between the parts will be afforded.

It is a further object to provide a band brake construction which is composed of few parts and which may be readily mounted as a substitute for the present expanding brake used upon the rear axle of Ford cars.

Other objects will appear hereinafter.

The invention is illustrated in the accompanying drawings in which:

Figure 1 is a view in side elevation of the brake drum and its band as mounted upon a vehicle axle and as seen looking outwardly toward the wheel.

Fig. 2 is a view in vertical section as seen on the line 2—2 of Fig. 1 and with parts broken away.

Fig. 3 is a view in vertical section through the central band suspension member as particularly illustrated in Fig. 1.

Referring to the drawings more particularly, 10 indicates the rear driving axle of an automobile and showing the axle rotatably mounted within an axle housing 11. The outer end of the axle 10 is secured in a suitable manner within a wheel hub 12 provided with a circular bolting flange 13 against which vehicle spokes 14 are secured by means of bolts 15. The axle housing, as commonly constructed, is formed with circular flange members 16 which are disposed at right angles to the circumference of the housing and normally utilized as a means for inclosing the open end of brake drums which, in this construction, have been eliminated. All of the foregoing mentioned parts are those which are standard upon cars to which this invention relates and are used without alteration.

The brake mechanism here provided consists of a drum member 17 formed with an end portion 18 around the outer edge of which an annular wall 19 is made. The wall 19 is fitted with an inwardly extending flange portion 20 which lies parallel to the end portion 18 and terminates adjacent the outer periphery of the circular flange member 16 with which the axle housing is provided. The drum, as described, is secured to the vehicle wheel bolts 15 which pass through the bolting flange 13 and are held by nuts 21 through the end wall 18 of the drum. A spider 22 is bolted upon the flange 16 of the axle housing by a bolt 23 which was originally used in connection with the old brake. This bolt passes through a horizontally disposed spider arm 24 which extends rearwardly and is bent to overhang the drum and is engaged by a pin 25 which passes through an opening 26 in the spider and is secured by an enlarged flange portion 27 to a circular flexible steel brake band 28 by suitable rivets. A coil spring 29 is placed around the pin 25 and exerts a force between the spider arm and a washer 30 which is held adjacent the end of the pin by a cotter pin 31. This spring acts to draw the pin 25 and the brake band attached thereto away from the brake drum around which the band lies. Arms 32 and 33 of the spider member 22 extend at right angles to the arm 24 and upon opposite sides thereof. These arms bend at their ends and overhang the brake drum and are adapted to receive pins 34 and 35 which are secured to the brake band and hold the band in its outermost position by means of coiled springs 36 which act against washers 37.

The brake band, as yieldably supported by the pins 34, 35 and 25 upon the spider 22, is of sufficient length to substantially encompass the brake drum 17 and has pivotally mounted at one of its ends an actuating lever 38 which is pivotally connected to the brake band by means of a pivot pin 39 engaging bosses 40. The outer end of the lever member 38 is provided with an opening 41 which is formed with a spherical socket portion 42 adapted to receive the rounded end of a wing-nut 43. The wing-nut 43 is mounted upon the end of an adjusting bolt 44 which is pivotally connected within the looped end 45 of the brake band. It will thus be seen that by means of the wing-nut 43 the band may be adjustably drawn around the periphery of the brake drum 17 and cause its friction lining 46 to bear thereupon.

The brake actuating lever 38 is mounted to rotate at its center and is fixedly secured to a brake shaft 47 which is in turn rotated by means of a lever arm 48 operatively connected to a connecting link 49 which leads to a suitable foot pedal or hand lever. By the rotation of the shaft 47 the brake lever is moved in the direction indicated by the arrow —a— in Fig. 1 and when so rotated will draw the terminating ends of the brake band together and thus cause the friction lining 46 to bear forcibly against the outer periphery of the brake drum 17.

In applying the brake mechanism here shown to a vehicle of the Ford type it is first necessary to remove the wheel and brake drum with which it is equipped and place the drum 17 upon the wheel in lieu of the original drum. The wheel is then remounted upon the axle and secured by a nut 50 which engages the end of the axle spindle. When the wheel is in position it will allow the flange portion 20 of the brake drum to register with the periphery of the flange 16 and thereby prevent dust and dirt from collecting within the drum. The brake spider 22 is now secured in position upon the flange 16 by means of the bolt 23. The band brake is mounted upon the spider in the resilient manner afforded by the coiled springs 29 and 36. When the band is connected at its terminating ends to the brake operating mechanism it is in its complete assembled position.

In operating the band brake, the connecting link 49 is drawn and the lever arm 38 is swung, as indicated by the arrow, this action drawing the brake band tightly around the drum and compressing the suspension springs 29 and 36, which normally maintain the band in a floating condition.

It will thus be seen that a band brake is here provided as a substitute for a brake of smaller diameter and power and that the brake here described and illustrated may be readily mounted upon a vehicle axle and will effectively operate thereon.

Thus I have produced a brake attachment for a wheel construction; said wheel construction having an axle housing, a circular housing flange extending from the end of the axle housing, an axle in the axle housing, a wheel hub upon the axle against the end of the axle housing, and spokes extending from the hub and spaced from the housing flange; said attachment comprising a brake drum adapted to be mounted rigid with the hub and spokes and span the space to the housing flange, said brake drum being larger in diameter than the housing flange and there being an inwardly extending drum flange registering with the housing flange, a brake band for the drum, a spider secured to the housing flange and yieldingly supporting the brake band, and means for operating the brake band.

I claim:

1. A brake attachment for a wheel construction; said wheel construction having an axle housing, a circular housing flange extending from the end of the axle housing, an axle in the axle housing, a wheel hub upon the axle against the end of the axle housing, and spokes extending from the hub and spaced from the housing flange; said attachment comprising a brake drum adapted to be mounted rigid with the hub and spokes and span the space to the housing flange, said brake drum being larger in diameter than the housing flange and there being an inwardly extending drum flange registering with the housing flange, a brake band for the drum, a spider secured to the housing flange and yieldingly supporting the brake band, and means for operating the brake band.

2. A brake attachment for a wheel construction; said wheel construction having an axle housing, a circular housing flange extending from the end of the axle housing, an axle in the axle housing, a wheel hub upon the axle against the end of the axle housing, and spokes extending from the hub and spaced from the housing flange; said attachment comprising a brake drum adapted to be mounted rigid with the hub and spokes and span the space to the housing flange, said brake drum being larger in diameter than the housing flange and there being an inwardly extending drum flange registering with the housing flange, and a brake band for the drum.

In testimony whereof I have signed my name to this specification.

WILLIAM J. MILLER.